No. 613,619. Patented Nov. 1, 1898.
F. L. CLAPP
BACK PEDALING BRAKE.
(Application filed July 7, 1897.)
(No Model.)
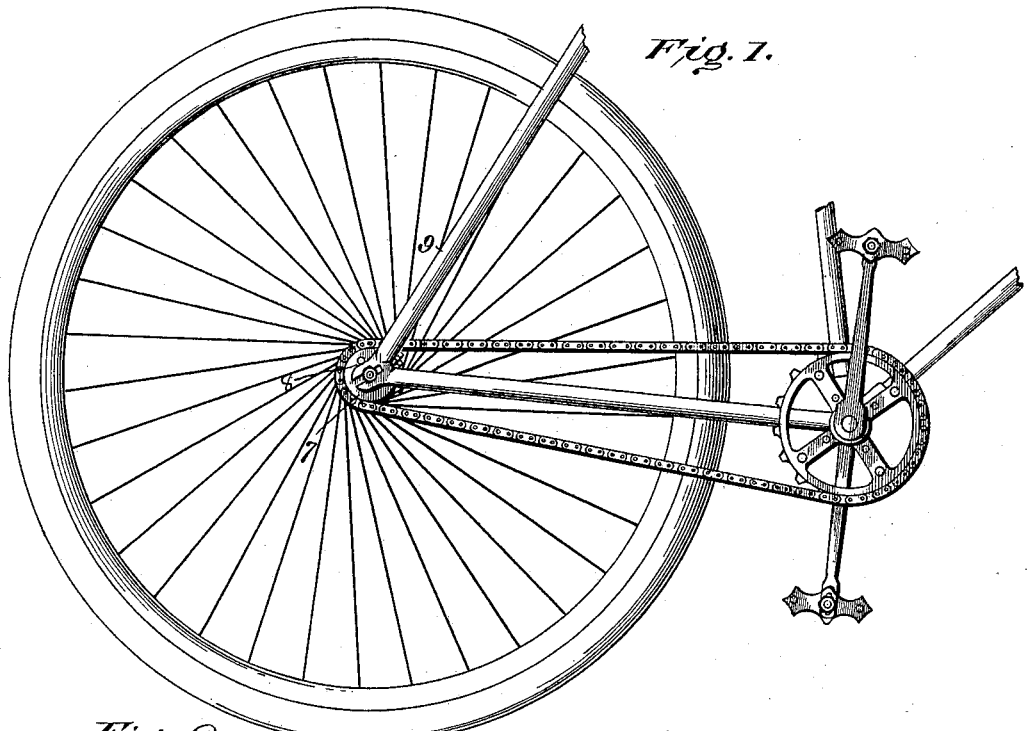
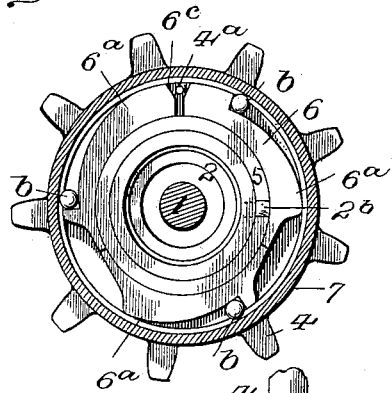
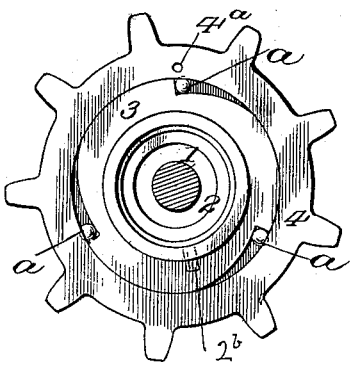
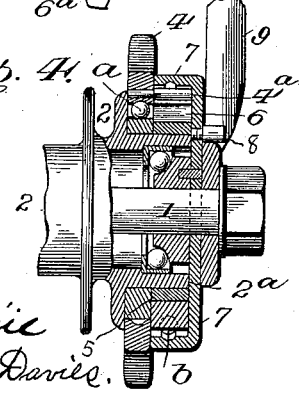
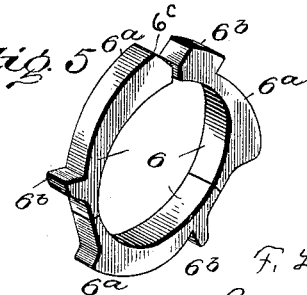
Witnesses
Inventor
F. L. Clapp
By W. H. Bartlett
Attorney
THE NORRIS PETERS CO., PHOTO-LITHO., WASHINGTON, D. C.

UNITED STATES PATENT OFFICE.

FRANK L. CLAPP, OF NORTHAMPTON, MASSACHUSETTS, ASSIGNOR TO JOHN DAVITT KEATING, OF MIDDLETOWN, CONNECTICUT.

BACK-PEDALING BRAKE.

SPECIFICATION forming part of Letters Patent No. 613,619, dated November 1, 1898.

Application filed July 7, 1897. Serial No. 643,708. (No model.)

*To all whom it may concern:*

Be it known that I, FRANK L. CLAPP, residing at Northampton, in the county of Hampshire and State of Massachusetts, have invented certain new and useful Improvements in Brakes for Cycles, of which the following is a specification, reference being had therein to the accompanying drawings.

This invention relates to bicycles and other cycles.

The object is to produce a clutch-brake which may be applied by back-pedaling.

The invention consists in certain constructions and combinations of parts.

Figure 1 is a broken side elevation of so much of a bicycle as is needed to give an idea of the relation of parts. Fig. 2 is a vertical section extending through the wheel-hub and through the compression cams or wedges. Fig. 3 is a vertical section through the hub and its friction driving-clutch. Fig. 4 is a vertical cross-section through a wheel-hub, showing part of frame. Fig. 5 is a perspective of the compression cams or wedges.

Heretofore brakes for bicycles have been known in which the brake was applied by back-pedaling; but in general the back-pedaling must be continued in order to hold the brake applied. In my construction the brake is applied by the first backward movement of the pedals, and may then be held in action by holding the pedal in stationary position, thus relieving the rider of exertion beyond the mere resting of the foot on the pedal and holding it, and the brake may be applied with greater or less force, according to the pressure on the pedal.

The numeral 1 indicates the axle of the driving-wheel. 2 denotes the hub, which turns on the axle, ball-bearings of the usual construction being interposed. The hub has a cam-ring 3, of hardened steel, secured thereto, preferably by a stud or pin on the hub entering a recess in ring 3, and the driving sprocket or ring 4 surrounds said clutch-piece or cam-ring, the balls $a$ being interposed between the teeth of the clutch-piece and the inside surface of the driving-sprocket and preferably in a groove in the sprocket-ring. This permits a rotation of the sprocket-ring in one direction (backward) without moving the hub; but when the sprocket-ring is driven forward the balls pinch between the inside of the ring and the inclined faces of the teeth on the cam-ring and cause the clutch-wheel and hub to rotate with the sprocket-ring. Other automatic clutch-gear might be used to the same effect in this relation.

Surrounding a cylindrical extension $2^a$ of the hub I supply a wearing-ring 5. This ring is preferably a broken ring and may be of hardened steel, bronze, or other material which will endure much wear. If the ring is a broken ring, it can be readily renewed. A spline or stud $2^b$, projecting from the hub, causes this ring 5 to partake of any rotary movement of the hub, and this may be the same spline or stud which holds the cam-ring 3 against rotation independently of the hub.

Surrounding the wear-piece or ring 5 I place the cam-wedges 6, these wedges constituting a very important part of my invention. The wedge-pieces 6 are curved on their inner faces and conform generally to the wearing-ring on which they rest. The outer face of each piece 6 has an inclined surface or tooth $6^a$ and a projecting stop $6^b$. The total length of the wedge-pieces 6 is a little less than the circumference of a circle, leaving a space $6^c$, into which space a pin or stud $4^a$, projecting from the side of the sprocket 4, enters. When turning forward, this pin or stud causes the wedge-pieces 6 to partake of the movement of the sprocket-ring 4. Balls $b$ are interposed between the faces of teeth $6^a$ and the cup 7, and when the wedge-pieces are moved in one direction these balls find lodgment against shoulders or stops $6^b$; but when the wedge-pieces move in reverse direction these balls are wedged between the pieces 6 and cup 7.

The cup 7, which incloses the end of the hub, is prevented from rotating by a stud 8, projecting at the side of the frame 9; or the cup 7 may be otherwise secured against rotation either to the fixed axle or to the frame.

Inside the cup 7 there is preferably a groove, and in this groove, between the teeth of the wedges 6 and the cup, are balls $b$, having a limited movement when the sprocket-ring and wedge-pieces are moving forward. A reverse movement of the sprocket-ring causes the inclined faces of the wedge-pieces to wedge firmly against the balls, and thus press on the wear-piece 5, the balls being held against outward movement by cup 7. The strains are all compression strains, except on the ring.

When the sprocket-ring 4 and the cam-wedges are moved, as stated, the balls $b$ are caught between the inclined faces of the teeth $6^a$ and the cup 7, and as cup 7 cannot rotate the cam-wedges 6 are also held against rotation, thus acting to brake or retard the vehicle. In fact, the pressure may be so great as to lock the wheel; but a moderate backward pressure on the pedal causes such a frictional contact of the parts as to cause a very effective retardation. The first backward movement of the sprocket-ring caused by back-pedaling releases the clutch engagement of hub 2 with ring 4 and an instant later engages the wedges 6 with the cup 7. The compression of these wedges 6 by reason of the balls interposed between the teeth $6^a$ and the cup 7 causes these wedges 6 to bind firmly on the wear-piece 5, which is to all intents a part of the hub. The forward movement of the sprocket-ring by means of the pedal immediately unlocks the brake and reëngages the friction driving-clutch.

I have shown but three teeth and three balls interposed in each clutch; but the number may vary according to circumstances.

The wear-piece 5 is made in form of a broken ring, so as to be easily adjustable and removable. The operation of the device would be the same if the wedge-cams bore directly on the hub; but to prevent wear of the hub it is better that a wear-piece be interposed. In the same way the clutch-ring 3 might be integral with or secured to the hub; but as the result of experience I prefer to make these parts easily removable. As shown, they are simply slipped over the end of the hub and held against independent rotation by a spline, as is common in mechanics.

This brake may be applied to many wheels of common construction with very slight change. The cup 7 is common to several well-known wheels. The wedge-pieces 6 are easily made and applied. The driving-clutch is simple and can be easily applied to most wheel-hubs; but where a good clutch is present such will coact with the cam-wedges without difficulty. The balls can be readily procured. Rollers might be substituted; but I have found balls preferable.

I have illustrated this device as applied to a wheel driven by a pedal and chain; but it will be readily understood that it is immaterial how the sprocket-ring is driven, and a skilled mechanic will readily adapt my brake device to many different machines.

The friction-coupling, as will be seen in the preferred form illustrated, operates to quickly engage the hub in driving forward, and on reversal first disengages this coupling and applies a friction compression-brake to the hub, the same engaging a fixed part of the machine.

In this brake there are no springs and no levers. The entire operation is by cam or wedge action. The parts exposed to wear are easily replaceable without special tools.

What I claim is—

1. In a cycle, the hub and a friction clutch-coupling by which the hub may be coupled to the driving means, a cup connected to the frame, a series of wedges inclosed within said cup and each provided with a shoulder at one end, a series of balls interposed between the cup and the wedge-pieces, in position to bind on the wedge or bear loosely against the shoulders, and a wear-piece connected to the hub on which said wedges may be compressed, all combined substantially as described.

2. In a cycle, the driving-sprocket having an internal bearing, the hub having a cam-wheel and interposed balls constituting a friction clutch-coupling, and inclosing cup and balls, and a series of cam-wedges engaged by the sprocket-ring in its backward movement to secure compression of the wedges on said hub-piece, all combined substantially as described.

3. In a cycle, the wheel-hub and means for rotating the same, a series of wedges surrounding said hub, a cup inclosing said wedges, and balls inclosed between the wedges and the cup, and a projection on the sprocket-ring engaging the wedges, all combined substantially as described.

In testimony whereof I affix my signature in presence of two witnesses.

FRANK L. CLAPP.

Witnesses:
W. A. BARTLETT,
LUTHER A. CLARK.